US012687467B2

(12) United States Patent
Cui

(10) Patent No.: US 12,687,467 B2
(45) Date of Patent: Jul. 21, 2026

(54) TUNABLE MECHANICAL RESONATOR FOR HIGH-PRECISION CUTTING OF BIOLOGICAL TISSUE

(71) Applicant: Purdue Research Foundation, West Lafayette, IN (US)

(72) Inventor: Meng Cui, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 613 days.

(21) Appl. No.: 17/957,678

(22) Filed: Sep. 30, 2022

(65) Prior Publication Data

US 2023/0236092 A1 Jul. 27, 2023

Related U.S. Application Data

(60) Provisional application No. 63/302,764, filed on Jan. 25, 2022.

(51) Int. Cl.
G01N 1/06 (2006.01)

(52) U.S. Cl.
CPC ......... G01N 1/06 (2013.01); *G01N 2001/063* (2013.01); *G01N 2001/065* (2013.01)

(58) Field of Classification Search
CPC .............. G01N 1/06; G01N 2001/063; G01N 2001/065
USPC ......................................................... 83/575
See application file for complete search history.

(56) References Cited

U.S. PATENT DOCUMENTS

| | | | | |
|---|---|---|---|---|
| 8,839,700 | B2 * | 9/2014 | Chen | H04N 7/183 83/915.5 |
| 2003/0101858 | A1 * | 6/2003 | Tamura | G01N 1/06 83/575 |
| 2011/0316993 | A1 * | 12/2011 | Chen | H04N 7/18 83/13 |

FOREIGN PATENT DOCUMENTS

CN          1214623 A   *   4/1999   .........   A61B 5/15113

OTHER PUBLICATIONS

Translation, CN-1214623-A (Year: 2026).*

* cited by examiner

*Primary Examiner* — Nhat Chieu Q Do
(74) *Attorney, Agent, or Firm* — Purdue Research Foundation

(57) ABSTRACT

Apparatuses for cutting tissue include an oscillator assembly and a clamp. The oscillator assembly defines a resonance frequency and includes a frame, an excitation element, and a blade. The frame has an upper portion and a lower portion, and the lower portion is configured to oscillate relative to the upper portion. The excitation element is coupled with the lower portion of the frame, and the excitation element is selectively operable to provide an excitation signal to the oscillator assembly sufficient to cause the oscillator assembly to oscillate at the resonance frequency. The blade is coupled with the lower portion for sectioning tissue. The clamp is selectively moveable along the frame to alter the resonance frequency of the oscillator assembly.

16 Claims, 9 Drawing Sheets

TUNABLE MECHANICAL RESONATOR FOR HIGH-PRECISION CUTTING OF BIOLOGICAL TISSUE

CROSS-REFERENCE TO RELATED APPLICATIONS

The present patent application is related to and claims the priority benefit of U.S. Provisional Patent Application No. 63/302,764, filed Jan. 25, 2022, the content of which is hereby incorporated by reference in its entirety into the present disclosure.

GOVERNMENT SUPPORT CLAUSE

This invention was made with government support under EY032382, MH124611, NS107689, NS118302 and NS118330 awarded by the National Institutes of Health. The government has certain rights in the invention.

TECHNICAL FIELD

The present application relates to microscopy, and specifically to mechanically adjustable resontomes having tunable resonators adapted for cutting thin slices of biological materials.

BACKGROUND

This section introduces aspects that may help facilitate a better understanding of the disclosure. Accordingly, these statements are to be read in this light and are not to be understood as admissions about what is or is not prior art.

A microtome is a cutting tool used to produce thin slices of biological material known as sections. Microtomes are often used in microscopy, allowing for the preparation of samples for observation under transmitted light or electron radiation. Typical microtomes use steel, glass, or diamond blades depending upon the specimen being sliced and the desired thickness of the sections being cut. Microtomy is a method for the preparation of thin sections for materials such as bones, minerals and teeth, and an alternative to electropolishing and ion milling. Microtome sections can be made thin enough to section a human hair across its breadth, with section thickness often ranging between 50 nanometers (nm) and 100 micrometers ($\mu$m).

SUMMARY

Aspects of this disclosure describe improved vibrating blade microtomes adapted for cutting thin slices of biological material. The improvements can allow for various adjustments to be made to the vibrating blade microtomes, for example, tuning of the mechanical resonator, adjusting the frequency of the resonator, and adjusting the blade positioning, among others.

Specifically, the present disclosure includes embodiments which can include an oscillator assembly and a clamp. The oscillator assembly can define a resonance frequency and can include a frame, an excitation element, and a blade. The frame can have an upper portion and a lower portion, wherein the lower portion can be configured to oscillate relative to the upper portion. The excitation element can be coupled with the lower portion of the frame, and the excitation element can be selectively operable to provide an excitation signal to the oscillator assembly sufficient to cause the oscillator assembly to oscillate at the resonance frequency. The blade can be coupled with the lower portion of the frame. In some aspects, the blade can be sized for sectioning tissue. Further, in some aspects, the clamp can be configured to couple with the frame at one of a plurality of positions on the frame between the upper portion and the lower portion, and the clamp position on the frame can be selectively moveable between the upper portion and the lower portion to alter the resonance frequency of the oscillator assembly.

In some embodiments, the excitation element can include a magnet that is selectively operable to provide the excitation signal to the oscillator assembly. In other embodiments, the oscillator assembly can include a blade holder coupled with the lower portion of the frame. The blade holder can be configured to receive the blade.

In addition, the present disclosure describes various methods for configuring or operating a tunable mechanical resonator for high-precision cutting of biological tissue. In one embodiment, methods can include capturing the oscillation pattern of the blade upon oscillating the resonator assembly, capturing the static orientation of the blade, comparing the oscillation pattern of the blade with the static orientation of the blade using the data processor, and/or displaying an image indicative of the comparison of the oscillation pattern of the blade and the static orientation of the blade. In some embodiments, methods can include adjusting the static orientation of the blade.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

Figure 1:
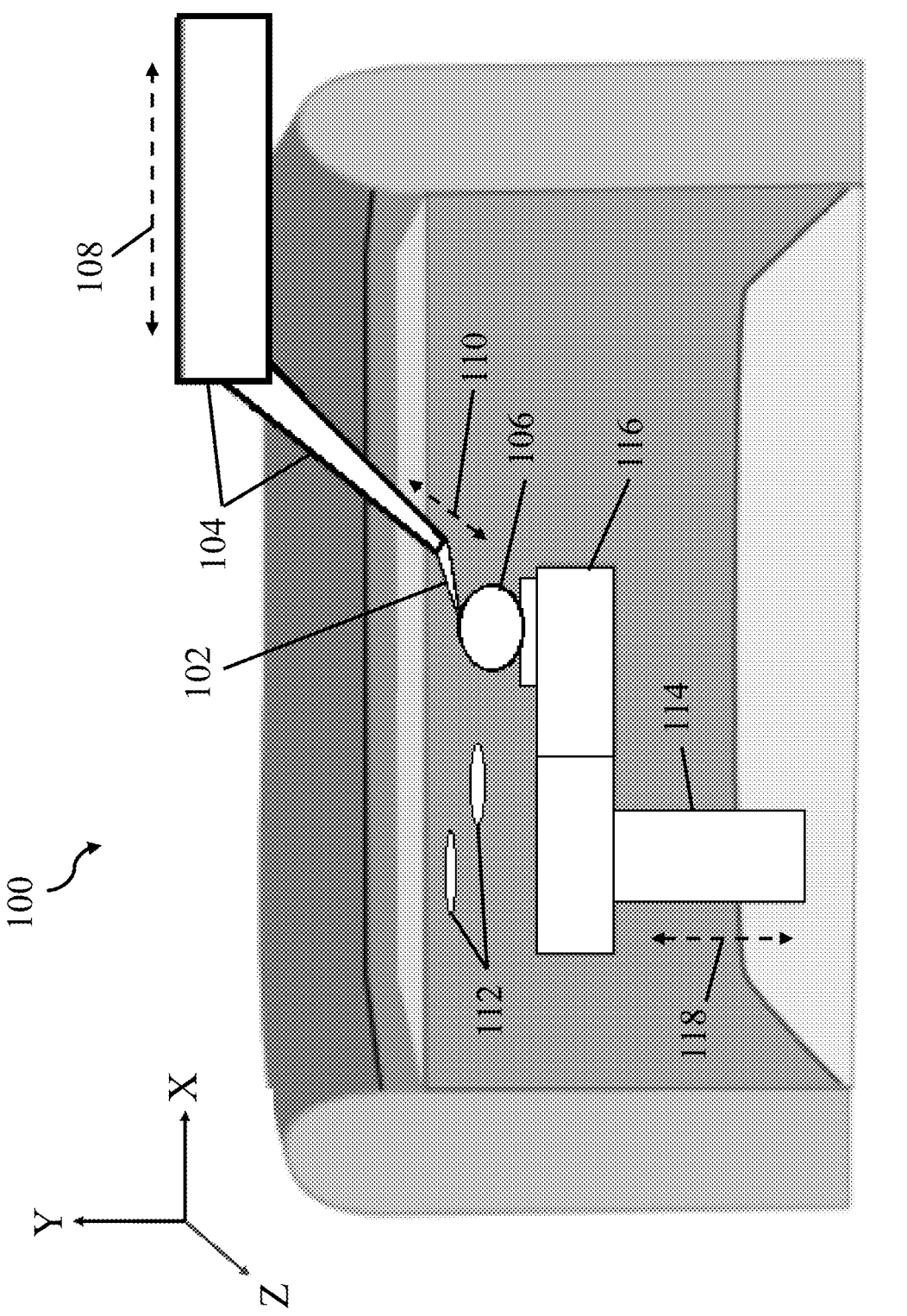
FIG. 1 depicts a prior art vibrating blade microtome assembly, showing a tissue material being cut into sections by a razor blade.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

As shown in FIG. 1, a vibrating blade microtome device (100) can include a razor blade (102) vibrating along the edge of a cutting assembly (104) while the razor blade (102) cuts into tissue material (106) as the cutting assembly (104) is able to be translated by an operator back and forth in a cutting direction (108) (i.e., parallel to the x-axis) which is defined perpendicular to the blade vibrating direction (110) (i.e., parallel to the z-axis) of the razor blade (102). More specifically, to have a precise cut, the cutting edge of the razor blade (102) must oscillate precisely along a cutting plane defined by the blade vibrating direction (110). Motions that deviate from the cutting plane can lead to rough surfaces of the sections (112) (i.e., the tissue material slices) and imprecise thicknesses of the sections (112). Further, the platform (114) may be adjustable to move the material holder (116) up and down along a vertical plane (118) (i.e., parallel to the y-axis). To accommodate biological tissues (106) of different hardness and fiber content, a vibrating blade microtome system ideally would provide a user with vibration frequency and amplitude adjustment controls.

To have a razor blade movement without any motion outside of the cutting plane (i.e., in the blade vibrating direction (110)), it would be preferable to have the vibration to be the native resonance mode of the overall mechanical structure of the cutting assembly (104) such that the motion excited is a single mechanical mode. Moreover, the frequency of the single mechanical mode should be adjustable. Accordingly, various aspects of the variable frequency resontome address these shortcomings of prior art vibrating blade microtomes, as well as additional shortcomings as will be described herein. While various specific examples of features of a variable frequency resontome will be described in greater detail below, other examples will be apparent to those of ordinary skill in the art according to the teachings herein.

Figure 2:
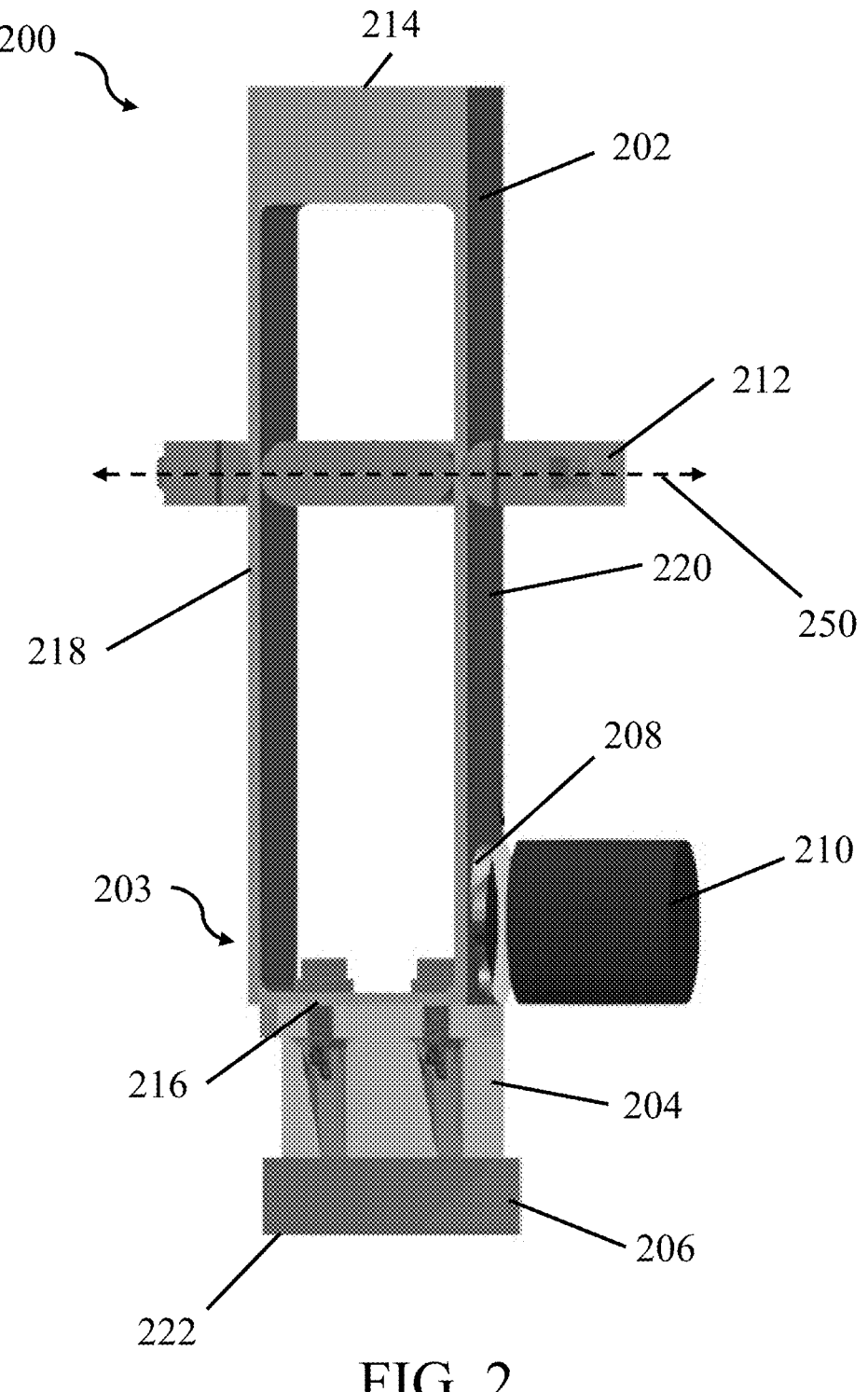
FIG. 2 depicts a front perspective view of one exemplary variable frequency resontome.

Shown in FIG. 2 is an exemplary variable frequency resontome assembly (200). The vibrating blade microtome assembly (200) includes various components such as a resonator or oscillator frame (202), a blade holder (204), a blade (206), an excitation element such as magnet (208), a coil (210), and a clamp (e.g., frequency adjuster (212)). The lower portion (203) of the oscillator frame (202) is coupled with the blade holder (204). As will be described below, the orientation blade of the blade holder (204) with respect to the oscillator frame (202) can be tuned within a small angle range. The blade (206) is further coupled with to the blade holder (204). The magnet (208), which may take the form of a compact magnetic disk, may be coupled with the lower end (203) of the oscillator frame (202). To drive the oscillator frame (202), the coil (210) is positioned near the magnet (208) and coupled with a power source (not shown) for providing an electrical current through the coil (210). By providing an alternating current to the coil (210), a push/pull force is applied to the magnet (208) which causes the oscillator frame (202) to oscillate (i.e., vibrate). In other embodiments, the excitation element can be any other known device or method for providing mechanical excitations (e.g., vibrations) to the oscillator frame (202). Accordingly, the blade holder (204) and coupled blade (206), being coupled to the end (203) of the oscillator frame (202), also oscillate (i.e., vibrate). Moreover, when an oscillating force is applied by the electrical current, coil (210), and magnet (208) at a resonant frequency of the entire assembly (200) (e.g., including the oscillator frame (202), blade holder (204), blade (206), and magnet (208)), the assembly (200) will oscillate at a higher amplitude than when the same force is applied at other, non-resonant frequencies. Accordingly, the oscillating motion of the assembly (200) may be confined to a single mechanical mode to enable the pure translation of the cutting blade (206) along (i.e., parallel to) the direction of its cutting edge (222). As such, only a single mechanical mode may be excited while other modes remain quiet, allowing the purest motion possible for the cutting process. The oscillator frame (202) may be, in some embodiments, formed having a rectangular body shape having an open center that is defined by top (214), bottom (216), and opposing side (218, 220) portions. In some embodiments, unibody machining may be employed such that the entire oscillator frame (202) frame is machined out of one piece of material. In alternative embodiments, the oscillator frame (202) may be formed having alternative shapes as would be apparent to those of ordinary skill in the art.

Figures 3A, 3B, 3C:
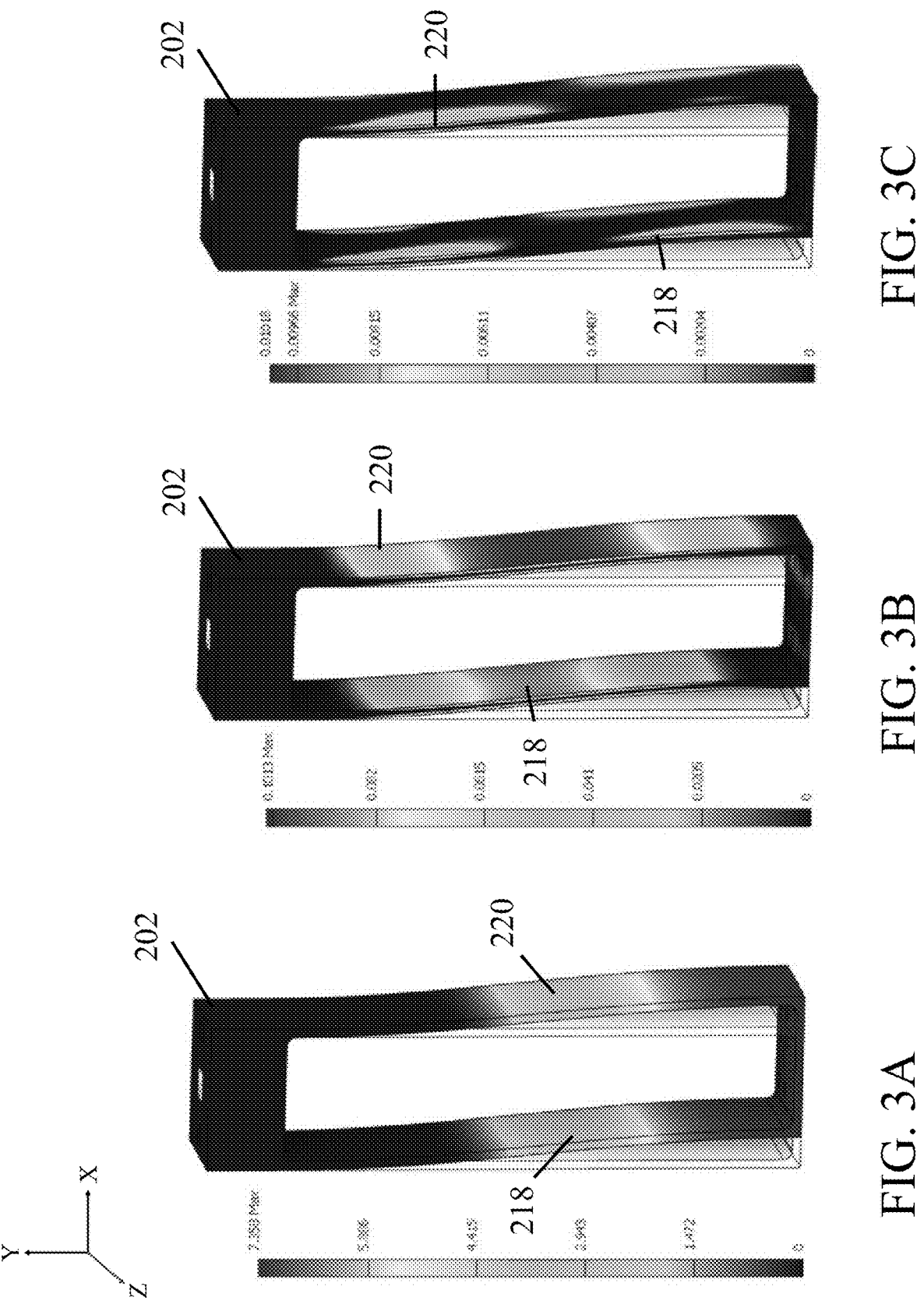
FIG. 3A depicts a front perspective view of the oscillator of the variable frequency resontome of FIG. 2, shown removed and isolated for clarity, showing x-axis (i.e., in-plane, movement parallel to the blade edge) displacement of the oscillator as simulated during a finite element analysis.
FIG. 3B depicts a front perspective view of the oscillator of the variable frequency resontome of FIG. 2, shown removed and isolated for clarity, showing y-axis (i.e., in-plane movement, perpendicular to the blade edge) displacement of the oscillator as simulated during the finite element analysis.
FIG. 3C depicts a front perspective view of the oscillator of the variable frequency resontome of FIG. 2, shown removed and isolated for clarity, showing z-axis (i.e., out-of-plane movement) displacement of the oscillator as simulated during the finite element analysis.

FIGS. 3A-C collectively show a finite element analysis for an oscillator frame (202) configuration such that one resonance mode oscillates the bottom (216) solely or substantially parallel to the blade edge (222). Unless otherwise described, each of FIGS. 3A-C is illustrated in units of millimeters. Illustrated by FIG. 3A of the finite element analysis, it can be observed that the motion of the fundamental resonance mode is dominated by the in-plane motion parallel to the blade edge (222) (i.e., in the x-axis direction). In comparison, as illustrated by FIG. 3B, the in-plane motion perpendicular to the blade edge (222) (i.e., in the y-axis direction) for lower portion (203) of the oscillator frame (202) is approximately $\frac{1}{1,000}^{th}$ of that of the in-plane motion parallel to the blade edge (222) (i.e., in the x-axis direction). For example, for an oscillating amplitude of 1 millimeter, the motion of the lower portion (203) of the oscillator frame (202) in the y-axis is only approximately 1 micron. Further, as illustrated by FIG. 3C, the out-of-plane motion for the lower portion (203) of the oscillator frame (202) (i.e., in the z-axis direction) is approximately $\frac{1}{10,000}^{th}$ of that of the in-plane motion parallel to the blade edge (222) (i.e., in the x-axis direction). Specifically, for an oscillating amplitude of approximately 1 millimeter, the out-of-plane motion (i.e., in the z-axis direction) is only approximately 100 nanometers.

Figure 4:
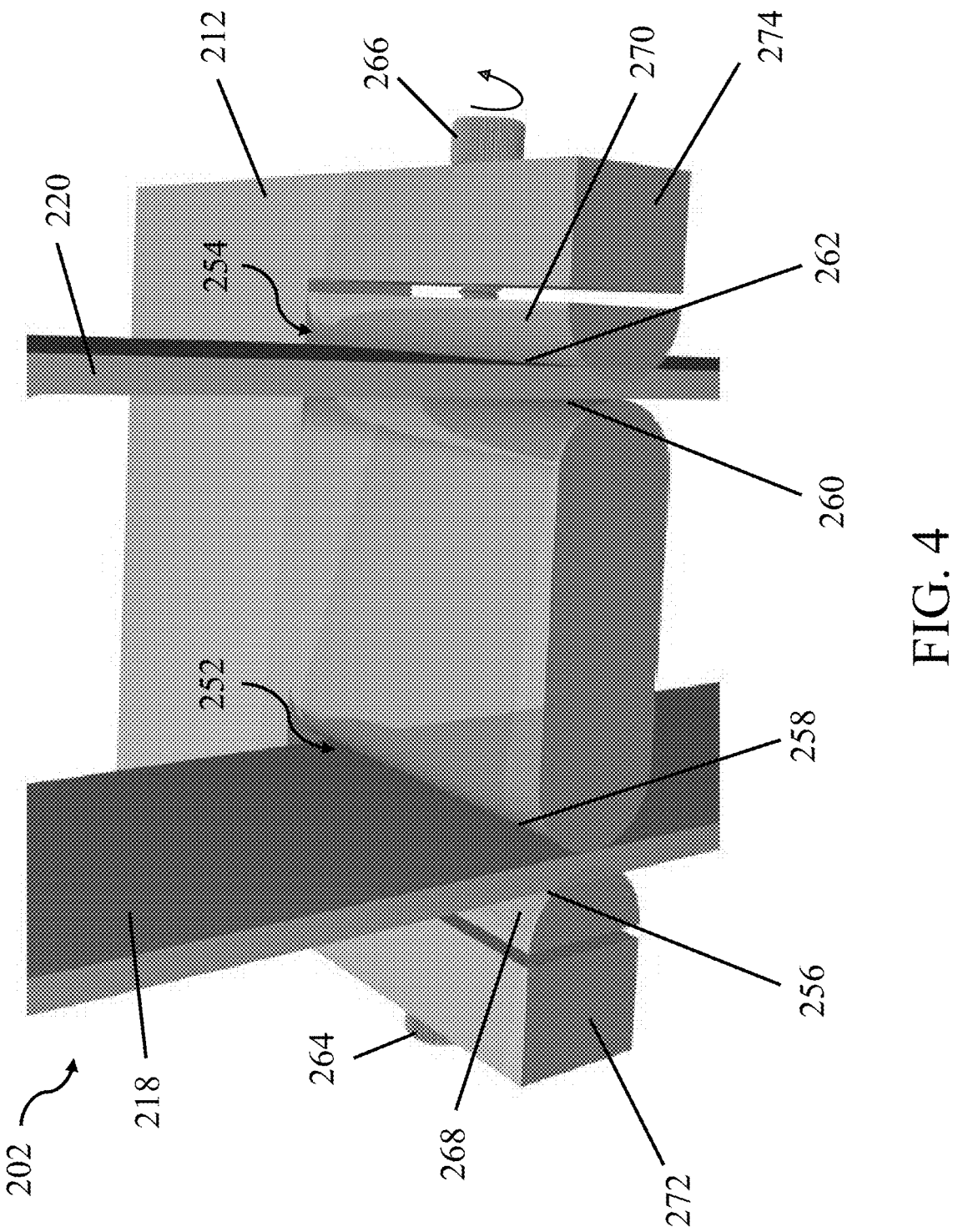
FIG. 4 depicts a front perspective close-up view of the frequency adjuster of the variable frequency resontome of FIG. 2.

FIG. 4 shows a close-up view of the frequency adjuster (212) of the vibrating blade microtome device (100). Specifically, the frequency adjuster (212) is configured to couple with each of the opposing side portions (218, 220) of the oscillator frame (202) at any vertical position along the body of the oscillator frame (202). The frequency adjuster (212) may be configured to couple with the opposing side portions (218, 220) of the oscillator frame (202) each along a common perpendicular plane (250) (see, FIG. 2) relative to the opposing side portions (218, 220). To couple with the opposing side portions (218, 220), the frequency adjuster (212) includes respective slots (252, 254) for the opposing side portions (218, 220) to be positioned within, respectively. First slot (252) of the frequency adjuster (212) further defines surfaces (256, 258) for coupling with (e.g., by pinching) the first side portion (218), and the second slot (254) of the frequency adjuster (212) further defines surfaces (260, 262) for coupling with (e.g., by pinching) the second side portion (220). To pinch the opposing side portions, one or both of the adjacent surfaces defined by the respective slot may be configured to translate along the plane (250) to contact the respective side portion. For example, in the illustrative embodiment, surface (256) is configured to translate relative surface (258) to thereby increase or decrease the size of the opening defined by the slot (252), and surface (262) is configured to translate relative surface (260) to thereby increase or decrease the size of the opening defined by the slot (254). To translate surfaces (256, 262), actuators (264, 266) may be coupled with moveable members (268, 270), whereby respective portions of moveable members (268, 270) define surfaces (256, 262). In some embodiments, as shown, actuators may be formed as threaded pins inserted through respective bore holes (not shown) through outer portions (272, 274) of the frequency adjuster (212), and coupled with each moveable member (268, 270). However, it should be understood that various mechanical or electrical actuators may be used to translate each moveable member (268, 270).

Figures 5A, 5B:
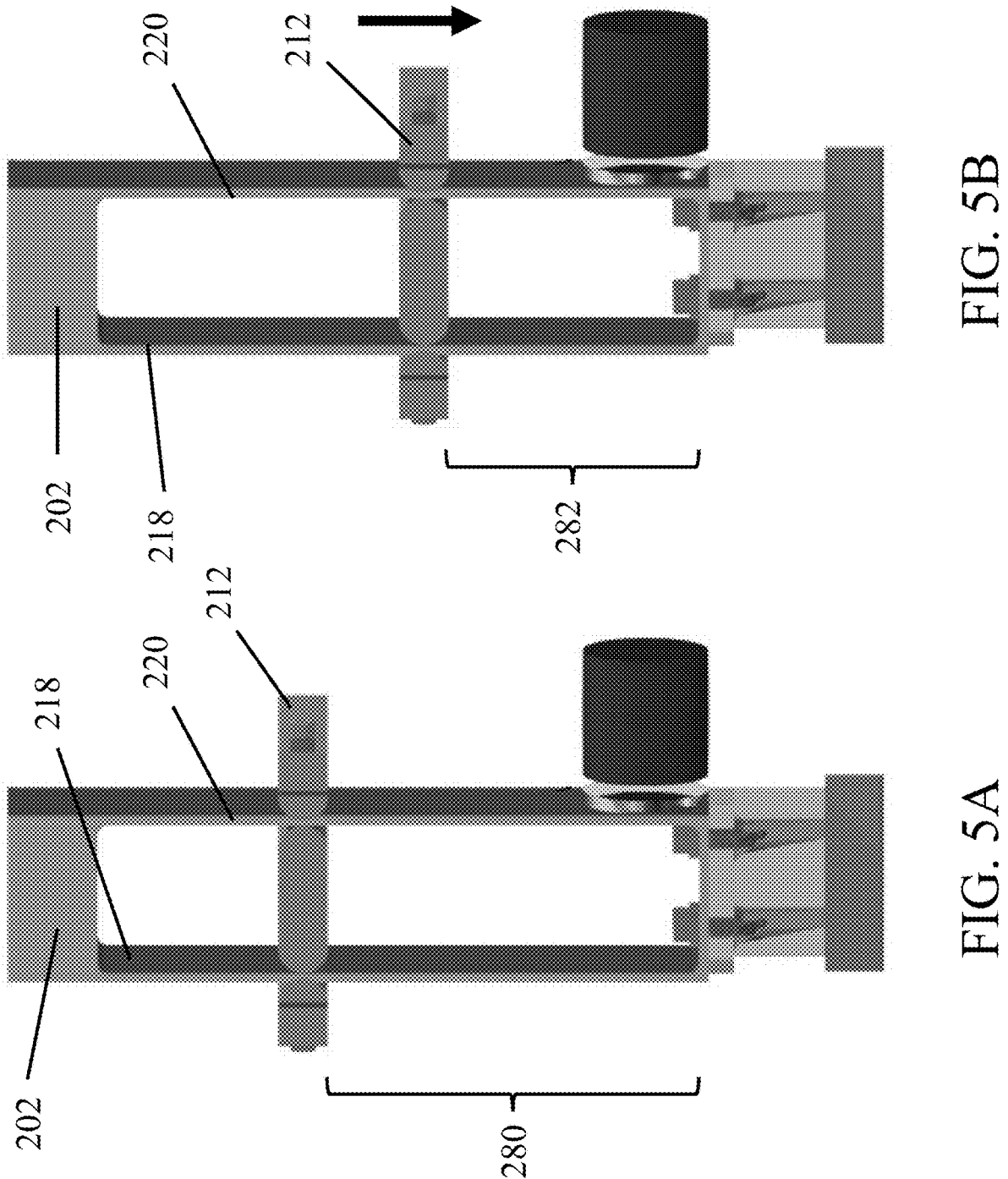
FIG. 5A depicts a front perspective view of the variable frequency resontome of FIG. 2, showing the frequency adjuster in a first position.
FIG. 5B depicts a front perspective view of the variable frequency resontome of FIG. 2, showing the frequency adjuster in a second position.
Figures 6A, 6B:
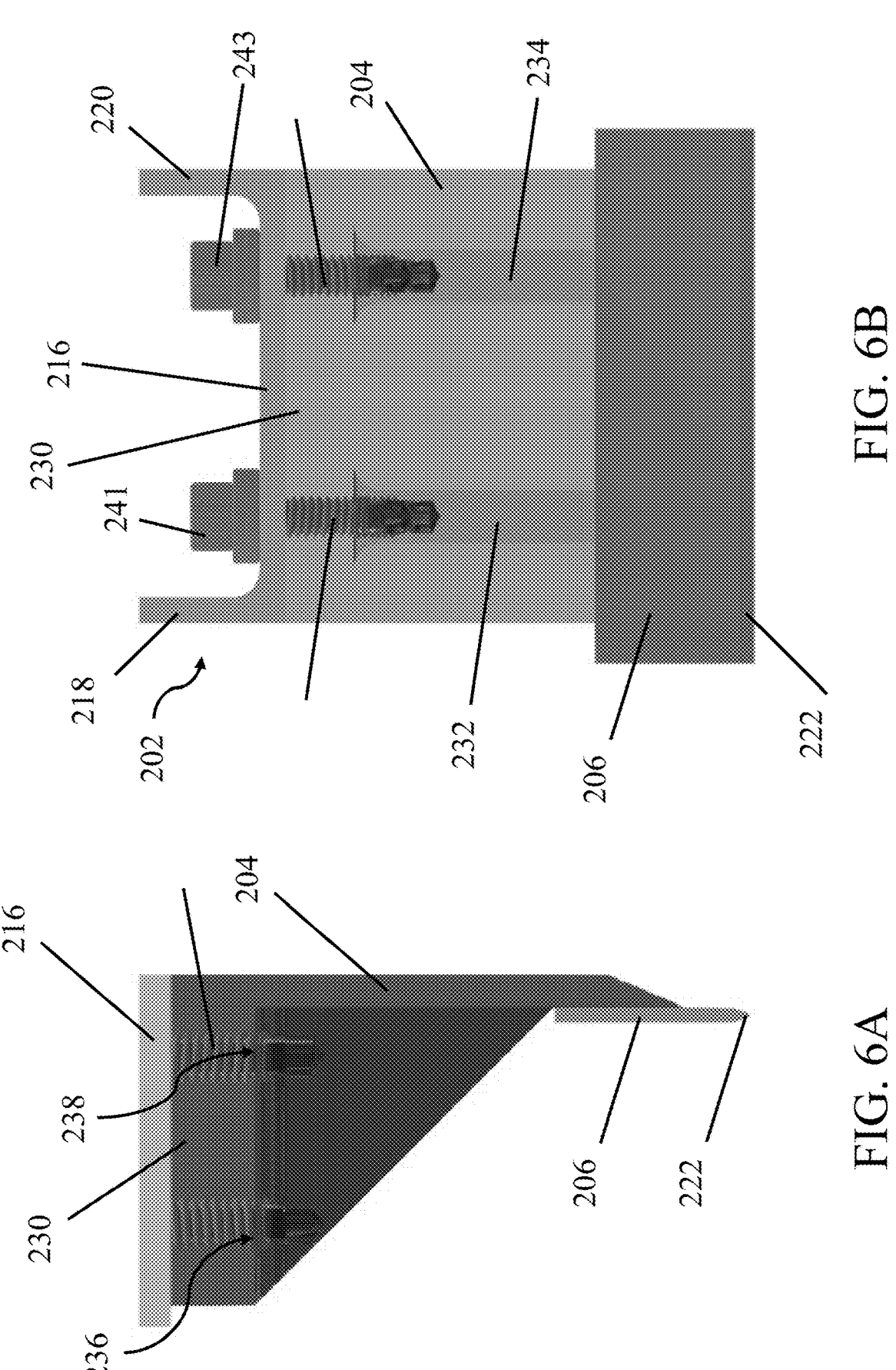
FIG. 6A depicts a side elevational view of the blade holder and blade of the variable frequency resontome of FIG. 2.
FIG. 6B depicts a front elevational view of the blade holder and blade of the variable frequency resontome of FIG. 2.
Figures 6C, 6D:
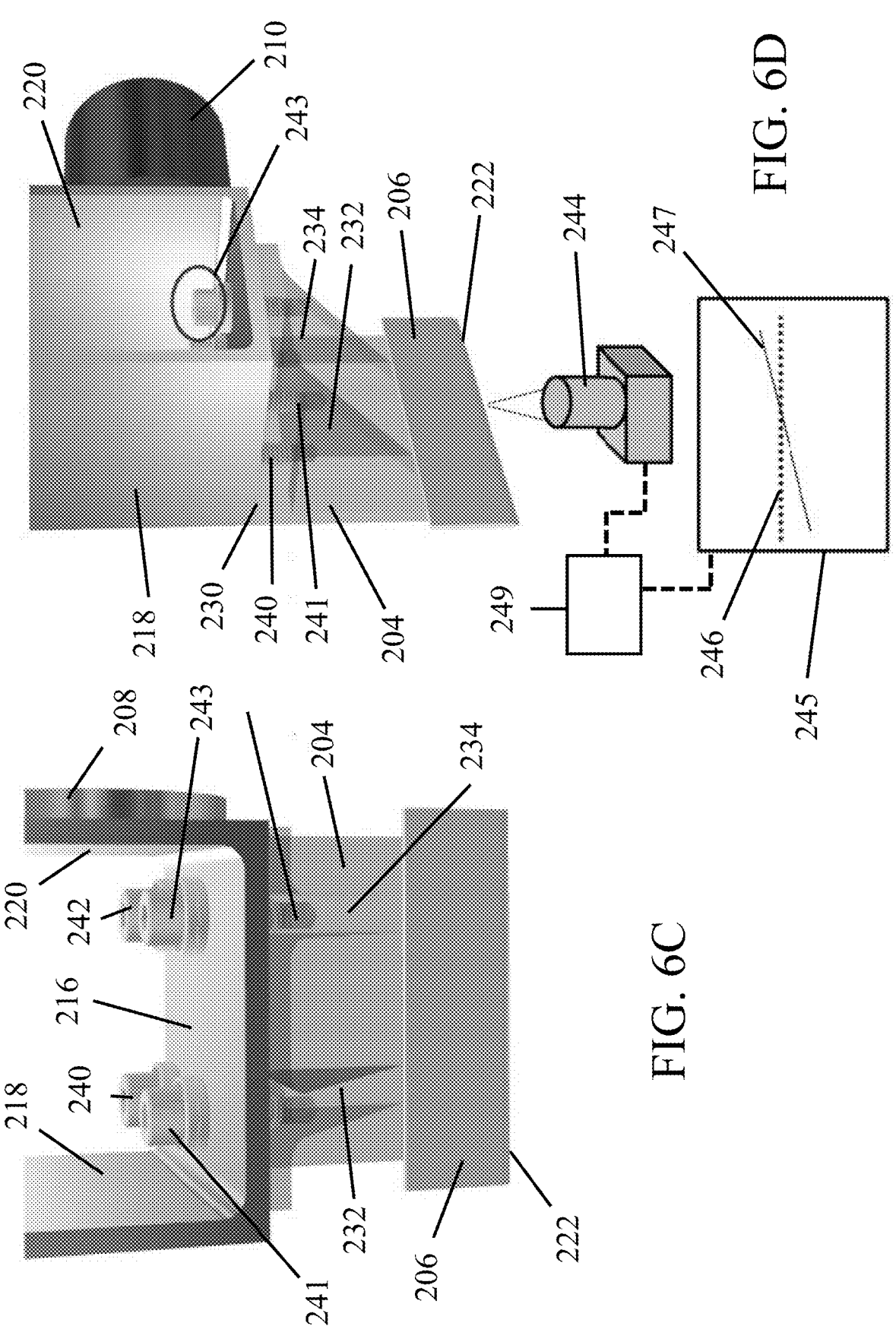
FIG. 6C depicts a front perspective view of the blade holder and blade of the variable frequency resontome of FIG. 2.
FIG. 6D depicts a side perspective view of the blade holder and blade of the variable frequency resontome of FIG. 2, showing an exemplary camera imaging the blade edge.
Figure 7:
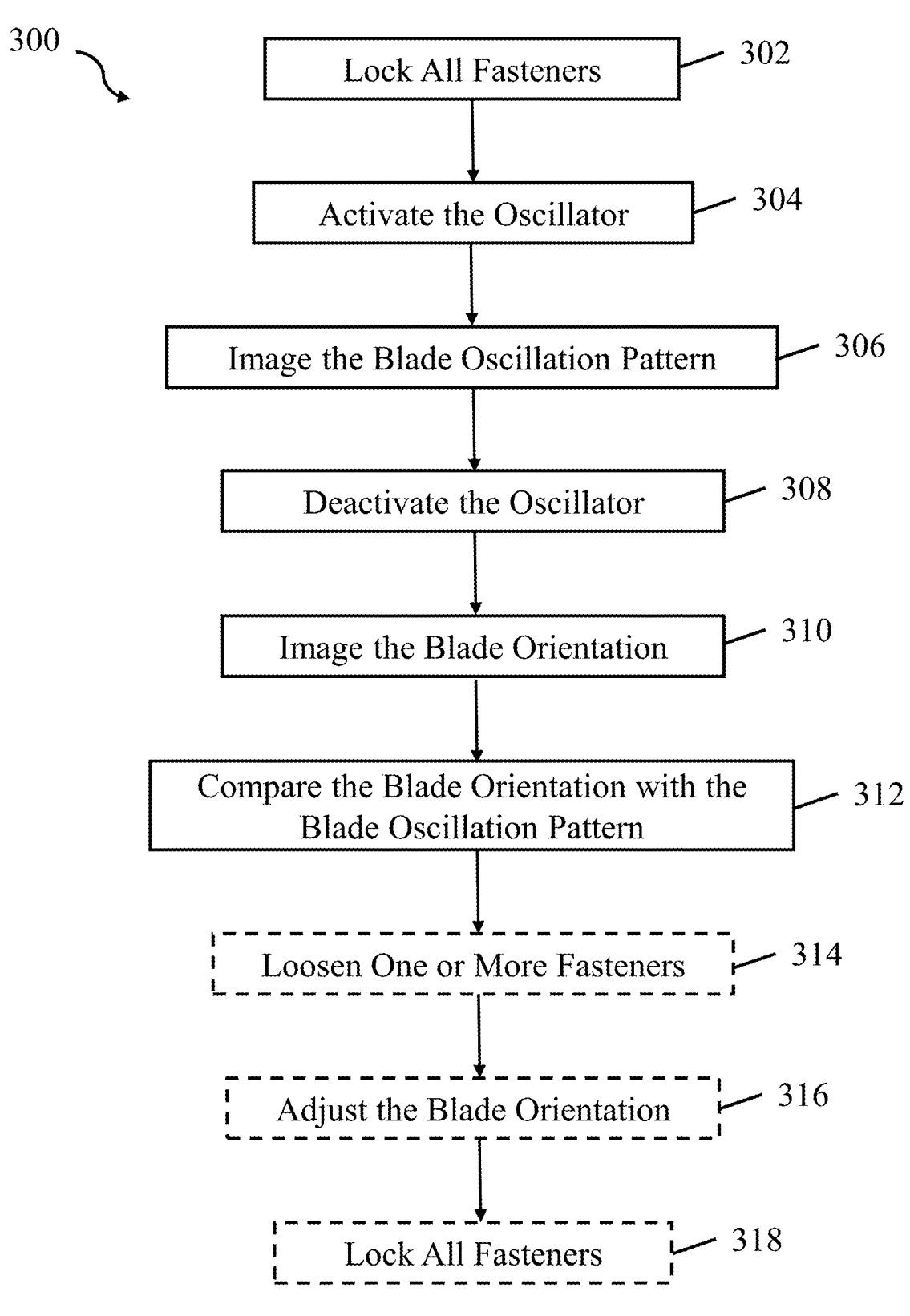
FIG. 7 depicts a flowchart of one exemplary method of initializing the blade orientation of the variable frequency resontome of FIG. 2.

Accordingly, actuators (264, 266) may be operated to selectively affix the frequency adjuster (212) to the oscillator frame (202) or to release the frequency adjuster (212) to the oscillator frame (202). FIG. 5A shows the frequency adjuster (212) affixed to the oscillator frame (202) at a first vertical position (e.g., on plane (250)), and FIG. 5B shows the frequency adjuster (212) vertically adjusted downward to affix the frequency adjuster (212) at a second vertical position. To tune the resonance frequency of the oscillation of the oscillator frame (202), the length of the oscillation arm as defined by the oscillator frame (202) can be adjusted by repositioning the frequency adjuster (212) vertically along the oscillator. For example, the oscillation arm (280) is longer in the configuration of FIG. 5A than is the oscillation arm (282) in the configuration of FIG. 5B. Locking the frequency adjuster (212) lower (e.g., as shown in FIG. 5B) effectively shortens the oscillating arm (282) length, which increases the resonance frequency of the oscillator frame (202). More specifically, setting the frequency adjuster (202) to a lower position will lead to a higher frequency relative to FIG. 5A. However, in some applications, the frequency adjuster (212) may be removed thereby permitting the full length of the oscillator to oscillate, and accordingly the oscillator will exhibit its lowest possible resonant frequency.

As described above, vibrating blade microtome device (100) includes a blade holder (204), a blade (206), with the lower portion (203) of the oscillator frame (202) being coupled with the blade holder (204) to transfer the vibrational movements thereto the blade holder (204) and blade (206). As shown in FIGS. 6A-D, the lower portion (203) of the oscillator frame (202) is coupled with an upper portion (230) of the blade holder (204). The upper portion (230) of the blade holder (204) includes access to a pair of bores or slots (232, 234), which are accessible by openings (236, 238), respectively (see, FIG. 6A). Specifically, one or more fasteners (240, 241, 242, 243) (e.g., machine screws) may be positioned through corresponding holes (not shown) in the bottom (216) of the oscillator frame (202) such that they each couple into one of the slots (232, 234). To secure the oscillator frame (202) with the blade holder (204), the fasteners (240, 241, 242, 243) may each be tightened to pull the blade holder (204) and oscillator frame (202) together and affix them relative to one another. Moreover, one or more fasteners (240, 241, 242, 243) may initially be loosened to allow the blade holder (204) to slide (i.e., by fasteners (240, 241, 242, 243) sliding within slots (232, 234)) relative to the oscillator frame (202) to allow proper blade (206) alignment prior to tightening the fasteners (240, 241, 242, 243) to lock the alignment into place.

To ensure accurate cutting, the blade edge (222) is preferred to be aligned as close to parallel as possible relative to the oscillator frame (202) movement (i.e., the x-axis in FIGS. 3A-3C). To account for any fabrication inaccuracies of the blade holder (204), the blade (206), or the bonding process between the blade holder (204) and blade (206), the method described above may be utilized to adjust the orientation of the blade (206) relative to the oscillator frame (202). Accordingly, referencing FIG. 6D, one method (300) of initializing the blade (206) position of the vibrating blade microtome device (100) includes, at step (302), initially locking (i.e., tighten) all of the fasteners (240, 241, 242, 243) and, at step (304), activating the oscillator frame (202) on resonance. Next, at step (306) a camera (244) may be used to image the blade edge (222) during the oscillation of the blade (206). Image analysis (245) will show the oscillation pattern (246) (i.e., the direction of oscillation), which will serve as the reference line (246) for the subsequent alignment of the blade (206. Next, at step (308), the oscillator frame (202) may be deactivated, and at step (310), the static blade edge (222) orientation (247) may be imaged by the camera (244). Next, at step (312), the static blade (222) orientation (247) may be compared, via a processor (249), to the oscillation pattern (246) determined in the previous step and the combined image (245) be generator and optionally displayed by a display screen. Optionally, if it is determined (e.g., by an operator or the processor (249)) that the orientation (247) of the blade edge (222) is not aligned parallel to the oscillating direction (246), at step (314) three of the fasteners (240, 241, 242, 243) (e.g., fasteners 240, 241, and 242) may be loosened while one fastener (240, 241, 242, 243) (e.g., fastener 243) may be left at least partially tightened to form a rotation axis. Next, at step (316), a device such (e.g., a micrometer or other precision actuator) may be used to adjust the orientation of the blade (206) relative to the oscillator frame (202) by moving the blade holder (204) and sliding the fasteners (240, 241, 242, 243) within slots (232, 234) such that the static blade edge (222) is re-oriented parallel to the reference line (246). Finally, at step (318), all fasteners (240, 241, 242, 243) may be tightened to lock the position of the blade holder (204) relative to the oscillator frame (202).

Figure 8:
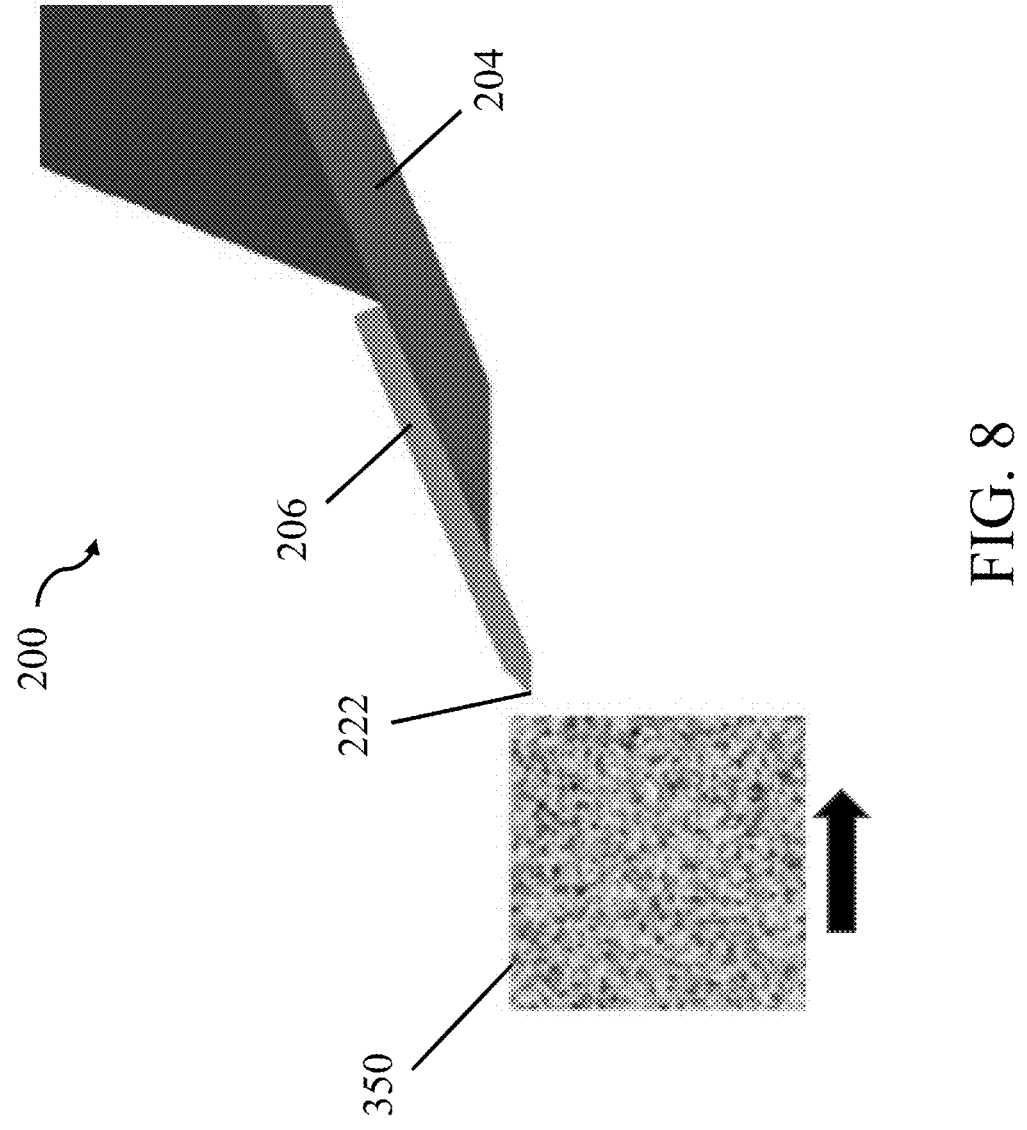
FIG. 8 depicts a side view of the variable frequency resontome of FIG. 2 performing a microtome sectioning on a tissue sample.

As shown in FIG. 8, the tissue sectioning (i.e., precision tissue cutting or slicing away from a larger block of tissue) is done through a relative motion between the tissue sample (350) and the oscillating blade (206). For an extremely soft sample, it may be preferable to keep the tissue sample (350) stationery while the oscillating blade (206) is translated toward it. For a relatively firm tissue sample (350), the tissue sample (350) may be positioned onto a motorized stage so as to move it toward the stationary vibrating blade (206). As described above, the blade (206) oscillation frequency can be adjusted by setting the position of the frequency adjuster (212). Lowering the position of the frequency adjuster (212) (i.e., moving it closer to the blade (206)) increases the resonance frequency of the assembly (200) including the blade (206), while raising the position of the frequency adjuster (212) (i.e., moving it further away from the blade (206)) decreases the resonance frequency of the assembly (200) including the blade (206). The oscillation amplitude can further be adjusted by adjusting the driving signal to the magnetic coil (210) and magnet (208). For example, higher driving voltage and current will lead to a greater oscillation amplitude.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

I claim:

1. An apparatus for cutting tissue, comprising:
   (a) an oscillator assembly defining a resonance frequency, wherein the oscillator assembly includes:
      (i) a frame having an upper portion and a lower portion, wherein the lower portion is configured to oscillate relative to the upper portion,
      (ii) an excitation element coupled with the lower portion of the frame, wherein the excitation element is selectively operable to provide an excitation signal to the oscillator assembly sufficient to cause the oscillator assembly to oscillate at the resonance frequency, and
      (iii) a blade coupled with the lower portion of the frame, wherein the blade is sized for sectioning tissue; and
   (b) a clamp configured to couple with the frame at one of a plurality of positions on the frame between the upper portion and the lower portion, the clamp including opposed slots respectively receiving a pair of legs of the frame and opposed pinching surfaces actuated along a common plane perpendicular to the legs to affix the clamp at identical positions on each leg; wherein vertical movement of the clamp between the upper portion and the lower portion changes an effective oscillation arm length of the frame and thereby alters the resonance frequency of the oscillator assembly.

2. The apparatus of claim 1, wherein the excitation element includes a magnet, wherein the magnet is selectively operable to provide the excitation signal to the oscillator assembly.

3. The apparatus of claim 2, further comprising:
   (a) a conductive coil positioned adjacent to the magnet; and
   (b) a power source configured to provide an alternating electric power signal through the conductive coil, wherein the magnet is selectively operable to provide the excitation signal when the power source provides the alternating electric power signal through the conductive coil.

4. The apparatus of claim 1, wherein the frame of the oscillator assembly includes:

(a) top and bottom surfaces; and (b) the pair of legs each coupled with the top and bottom surfaces, wherein the top and bottom surfaces and the pair of legs define a rectangular shape having an open center.

5. The apparatus of claim 4, wherein the frame is formed as a unibody machined structure having a rectangular shape with an open center.

6. The apparatus of claim 1, further comprising a blade holder coupled with the lower portion of the frame, wherein the blade holder is configured to receive the blade.

7. The apparatus of claim 6, wherein the blade holder defines an upper surface configured to couple with the lower portion of the frame and a lower surface configured to couple with the blade, wherein the upper surface of the blade holder defines one or more slots, the apparatus further comprising:

a plurality of fasteners each configured to couple the lower portion of the frame with the upper surface of the blade holder, wherein each of the plurality of fasteners is shaped to insert into at least one of the one or more slots.

8. The apparatus of claim 7, wherein each of the plurality of fasteners is selectively operable to translate along at least one of the one or more slots to adjust an orientation of the blade holder relative to the frame.

9. The apparatus of claim 1, further comprising:

(a) a camera positioned adjacent the blade and configured to capture a static orientation of the blade and an oscillation pattern of the blade; and (b) a processor communicatively coupled with the camera, wherein the processor is configured to compare the static orientation of the blade with the oscillation pattern of the blade and generate a display image indicative of the comparison.

10. An apparatus for cutting tissue, comprising:

(a) an oscillator assembly defining a resonance frequency, wherein the oscillator assembly includes:

(i) a frame having an upper portion and a lower portion, wherein the lower portion is configured to oscillate relative to the upper portion, wherein the frame includes:

(A) a top and bottom surface, and (B) a pair of legs each coupled with the top and bottom surfaces, wherein the top and bottom surfaces and the pair of legs define a rectangular shape having an open center;

(ii) an excitation element coupled with the lower portion of the frame, wherein the excitation element is selectively operable to provide an excitation signal to the oscillator assembly sufficient to cause the oscillator assembly to oscillate at the resonance frequency; and (b) a clamp configured to couple with each of the pair of legs of the frame, the clamp including opposed slots respectively receiving the pair of legs of the frame, the clamp defining opposed pinching surfaces actuated along a common plane perpendicular to the pair of legs to selectively affix the clamp to the pair of legs at identical positions on each leg; wherein the clamp includes threaded pins configured to translate moveable members that define the opposed pinching surfaces, and wherein the clamp is selectively moveable between the upper portion and the lower portion to change an effective oscillation arm length of the frame and thereby alter the resonance frequency of the oscillator assembly.

11. The apparatus of claim 10, wherein the clamp is removable to permit the full length of the oscillator frame to oscillate at its lowest possible resonant frequency.

12. The apparatus of claim 10, wherein the excitation element includes a magnet, wherein the magnet is selectively operable to provide the excitation signal to the oscillator assembly.

13. The apparatus of claim 12, further comprising:

(a) a conductive coil positioned adjacent to the magnet; and (b) a power source configured to provide an alternating electric power signal through the conductive coil, wherein the magnet is selectively operable to provide the excitation signal when the power source provides the alternating electric power signal through the conductive coil.

14. The apparatus of claim 1, further comprising a blade holder coupled with the lower portion of the frame, wherein the blade holder is configured to receive the blade.

15. The apparatus of claim 14, wherein the blade holder defines an upper surface configured to couple with the lower portion of the frame and a lower surface configured to couple with the blade, wherein the upper surface of the blade holder defines one or more slots, the apparatus further comprising:

a plurality of fasteners each configured to couple the lower portion of the frame with the upper surface of the blade holder, wherein each of the plurality of fasteners is shaped to insert into at least one of the one or more slots.

16. The apparatus of claim 15, wherein each of the plurality of fasteners is selectively operable to translate along at least one of the one or more slots to adjust an orientation of the blade holder relative to the frame.

* * * * *